US009668036B2

(12) United States Patent
Wellbrock et al.

(10) Patent No.: US 9,668,036 B2
(45) Date of Patent: May 30, 2017

(54) OPTICAL TRANSMISSION SYSTEM USING OPTICAL FREQUENCY COMB SOURCES

(71) Applicant: Verizon Patent and Licensing Inc., Arlington, VA (US)

(72) Inventors: Glenn A. Wellbrock, Wylie, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/887,570

(22) Filed: Oct. 20, 2015

(65) Prior Publication Data

US 2017/0111716 A1    Apr. 20, 2017

(51) Int. Cl.
| | |
|---|---|
| G02F 1/00 | (2006.01) |
| H04Q 11/00 | (2006.01) |
| G02B 6/35 | (2006.01) |
| G02B 6/42 | (2006.01) |
| H04J 14/02 | (2006.01) |

(Continued)

(52) U.S. Cl.
CPC ......... *H04Q 11/0005* (2013.01); *G02B 6/355* (2013.01); *G02B 6/4286* (2013.01); *H04B 10/501* (2013.01); *H04B 10/548* (2013.01); *H04B 10/61* (2013.01); *H04J 14/02* (2013.01); *H04L 1/0045* (2013.01); *H04Q 11/0062* (2013.01); *H04Q 2011/0015* (2013.01);

(Continued)

(58) Field of Classification Search
CPC .... H04B 10/03; H04B 10/032; H04B 10/038; H04B 10/505; H04B 10/5053; H04B 10/506; H04J 14/02; H04Q 11/0003; H04Q 11/0005

USPC ...... 398/2, 3, 4, 5, 10, 13, 17, 79, 183, 188, 398/158, 159, 45, 48, 33, 38, 66, 67, 68, 398/72, 7
See application file for complete search history.

(56) References Cited

U.S. PATENT DOCUMENTS

| | | | |
|---|---|---|---|
| 8,121,474 B2 * | 2/2012 | Rossetti .................. | H04J 14/02 398/2 |
| 2001/0021045 A1 * | 9/2001 | Tervonen ............. | H04B 10/077 398/5 |

(Continued)

OTHER PUBLICATIONS

Alic et al., "Nonlinearity Cancellation in Fiber Optic Links Based on Frequency Referenced Carriers." Journal of Lightwave Technology, vol. 32, No. 15, Aug. 1, 2014, 9 pages.

*Primary Examiner* — Hanh Phan

(57) ABSTRACT

A system includes an optical transmitter and an optical receiver. The optical transmitter includes a first comb light source, a second comb light source, an optical switch configured to selectively switch either the first comb light source or the second comb light source through to an output of the optical switch, and optical modulators configured to apply differential phase modulation, to channels associated with the switched first comb light source or with the second comb light source, to generate modulated light output signals. The optical receiver includes coherent receivers configured to receive the modulated light output signals from the optical transmitter, and detect and process the received, modulated light output signals to generate corresponding digital signals. The optical receiver further includes a digital signal processor configured to apply forward error correction to the digital signals to generate forward error corrected digital signals.

20 Claims, 8 Drawing Sheets

(51) Int. Cl.
*H04B 10/548* (2013.01)
*H04B 10/50* (2013.01)
*H04B 10/61* (2013.01)
*H04L 1/00* (2006.01)

(52) U.S. Cl.
CPC ............... *H04Q 2011/0016* (2013.01); *H04Q 2011/0079* (2013.01)

(56) References Cited

U.S. PATENT DOCUMENTS

| | | | | |
|---|---|---|---|---|
| 2002/0191904 | A1* | 12/2002 | Kani | H04B 10/506 385/24 |
| 2005/0163503 | A1* | 7/2005 | Lee | H04B 10/506 398/19 |
| 2011/0020003 | A1* | 1/2011 | Yu | H04B 10/548 398/79 |
| 2014/0341595 | A1* | 11/2014 | Harley | H04B 10/616 398/208 |

* cited by examiner

OPTICAL TRANSMISSION SYSTEM USING OPTICAL FREQUENCY COMB SOURCES

BACKGROUND

A passive optical network (PON) is a network that uses unpowered optical splitters to enable a single optical fiber to serve multiple premises. A PON typically includes an optical line terminal (OLT) at one end of the network, and multiple optical network units (ONUs) near the end users of the network. Optical signals are transmitted from the OLT via an optical fiber of the network, and transmitted to each of multiple premises via one or more unpowered optical splitters. Use of the unpowered optical splitters attenuates the optical signals such that the signal strength decreases relative to noise and interference over the optical fiber(s) of the network.

Other types of fiber optic networks use one or more Optical Add/Drop Multiplexers (OADMs), instead of optical splitters, for transmitting data at high speeds to and from customer locations. Such networks typically include central offices that each include the one or more OADMs, such as Reconfigurable OADMs (ROADMs), that perform optical wavelength selective switching of optical signals on incoming optical fibers to outgoing optical fibers such that data traffic may be routed to and from customer locations. Each customer location may include its own ROADM for selective switching of optical signals received from the ROADM in the central office. The ROADM in each customer location switches incoming optical signals to destination customer site equipment, or switches outgoing optical signals from source customer site equipment to the ROADM in the central office.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Optical transmitters, as described herein, employ optical frequency comb light sources for transmitting optical signals across an optical network. The optical frequency comb light sources transmit light at multiple frequencies/wavelengths, with all of the frequencies of the optical frequency comb being locked together such that their frequencies drift together if there is any frequency drift. Each optical transmitter includes multiple optical frequency comb light sources, including a primary optical frequency comb light source, and at least one backup optical frequency comb light source, for providing reliable light transmission in the event of the failure of the primary optical frequency comb light source. A detection and control unit monitors the light output of the primary optical frequency comb light source, and if there is a loss of signal indicative of failure of the frequency comb light source, the detection and control unit sends a control signal to a high speed optical switch to instruct the optical switch to "switch out" (i.e., disconnect) the primary optical frequency comb light source, and to "switch in" (i.e., connect) the backup optical frequency comb light source. With use of the high speed optical switch, the switching between the primary and the backup optical comb light sources occurs with minimal signal interruption.

Since the multiple frequencies of the optical frequency comb light are locked together, and drift together in the event of any frequency drift, calculations performed at an optical receiver for canceling nonlinearities induced in the optical signals during traversal of the optical fiber are significantly more accurate. With the accurate nonlinear cancelation/compensation, channel power can be increased by orders of magnitude to boost optical signal-to-noise ratio (OSNR) such that the optical signals can travel farther and, therefore, longer optical fiber spans between the optical transmitter and the optical receiver may be used without requiring additional optical amplifiers.

Figure 1:
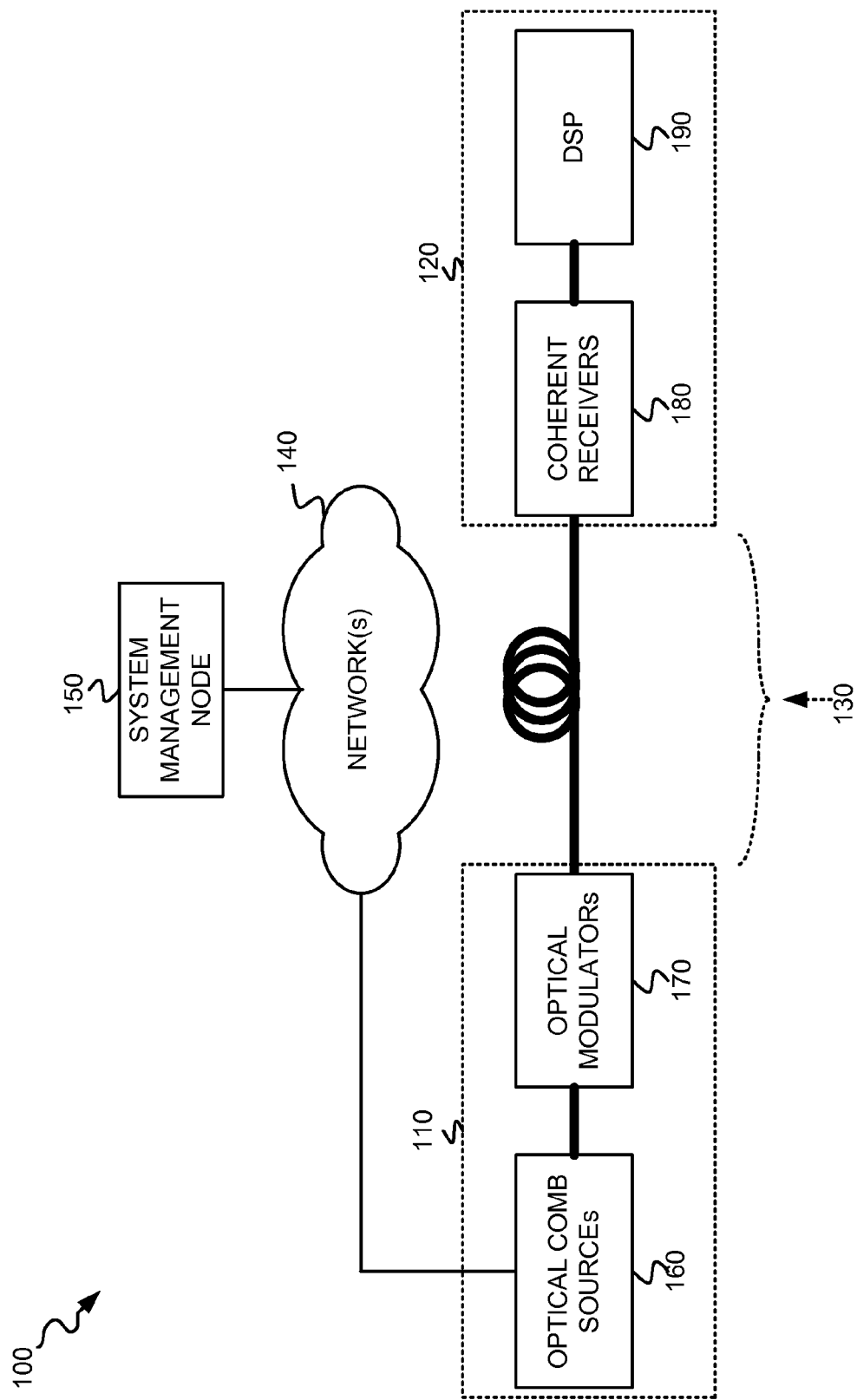
FIG. 1 is a diagram that depicts an exemplary optical network in which data is transmitted across the optical network using light generated by optical frequency comb light sources.

FIG. 1 is a diagram that depicts an exemplary optical network 100 in which data is transmitted across optical network 100 using light generated by optical frequency comb light sources. As shown, optical network 100 may include an optical transmitter 110, an optical receiver 120, optical fiber 130, a network(s) 140, and a system management node 150.

Optical transmitter 110 includes optical comb sources 160 and optical modulators 170. Optical comb sources 160 include multiple light sources that each generates an optical frequency comb output having multiple channels whose frequencies are locked together. In one implementation, described below with respect to FIG. 2, optical comb sources 160 include a primary light source that generates a first optical frequency comb output, and a backup light source that generates a second optical frequency comb output. In other implementations, optical comb sources 160 may include multiple backup frequency comb light sources that may be switched through optical switch 210. Optical modulators 170 include, among other components described below with respect to FIG. 2, multiple modulators for modulating light of multiple optical channels 1 through n, with each channel 1 through n of network 100 having a corresponding optical wavelength $\lambda_1$ through $\lambda_n$. Each of the multiple modulators modulates input light of a certain wavelength $\lambda$ based on received data to be transmitted. In one implementation, each of the multiple modulators includes components for applying differential phase modulation to the input light of wavelength $\lambda$ based on the received data to be transmitted.

Optical receiver 120 includes coherent receivers 180 and a Digital Signal Processing (DSP) unit 190 (referred to herein as "DSP 190"). Coherent receivers 180 includes multiple coherent receivers, with each of the multiple coherent receivers receiving, coherently detecting, and analog-to-digital converting modulated light signals of a particular wavelength λ. Coherent receivers 180 pass the resulting digital signals to DSP 190 for digital signal processing. DSP 190 performs, for example, forward error correction (FEC) upon the digital signals for each channel having one of the wavelengths $\lambda_1$-$\lambda_n$, and additionally performs nonlinear compensation, as described further below with respect to FIG. 2.

Network(s) 140 may include one or more networks of various types including, for example, a public land mobile network (PLMN) (e.g., a Code Division Multiple Access (CDMA) 2000 PLMN, a Global System for Mobile Communications (GSM) PLMN, a Long Term Evolution (LTE) PLMN, and/or other types of PLMNs), a satellite network, a telecommunications network (e.g., Public Switched Telephone Networks (PSTNs)), a local area network (LAN), a wide area network (WAN), a metropolitan area network (MAN), an intranet, the Internet, and/or a cable network (e.g., an optical cable network).

System management node 150 includes one or more network devices that connect to network(s) 140 and which receives notifications of conditions associated with optical transmitter 110, optical receiver 120 and/or other components of network(s) 140. The notifications may include alerts or alarm messages associated with failures of optical fiber 130, or failures at optical transmitter 110 or optical receiver 120. In one implementation, for example, the notifications include alert messages notifying system management node 150 of optical comb light source failure at optical transmitter 110.

The configuration of the components of optical network 100 depicted in FIG. 1 is for illustrative purposes only, and other configurations may be implemented. Therefore, optical network 100 may include additional, fewer and/or different components, that may be configured differently, than depicted in FIG. 1. For example, though only a single optical transmitter 110, a single optical fiber 130, and a single optical receiver 120 are depicted in FIG. 1, optical network 100 may include multiple different optical transmitters 110 interconnected with multiple different optical receivers 120 via multiple optical fibers 130. Each optical transmitter 110 of the multiple optical transmitters 110 connects to network(s) 140 such that alert notifications can be transmitted to system management node 150 upon optical comb light source failure at optical transmitter 110.

Figure 2:
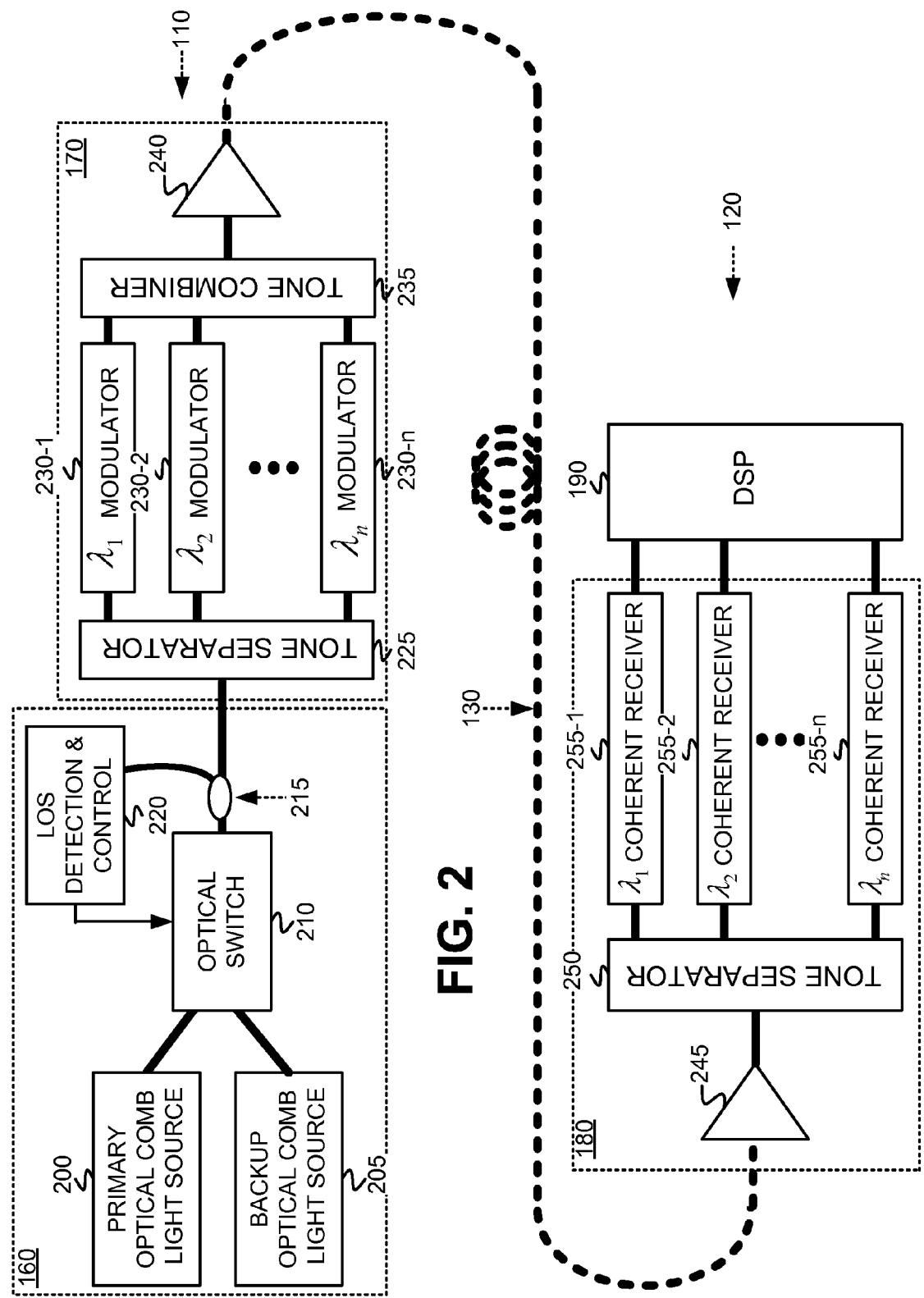
FIG. 2 depicts further details of components of the optical transmitter and the optical receiver of FIG. 1.

FIG. 2 depicts further details of exemplary components of optical transmitter 110 and optical receiver 120. As shown, optical comb sources 160 of optical transmitter 110 includes a primary optical frequency comb light source 200, a backup optical frequency comb light source 205, an optical switch 210, an optical splitter 215, and a Loss of Signal (LOS) detection and control unit 220 (referred to herein as "LOS detection unit 220").

Primary optical comb light source 200 generates a first optical frequency comb output having multiple channels whose frequencies are locked together, with the first optical frequency comb output being supplied to a first input of optical switch 210. Backup optical comb light source 205 generates a second optical frequency comb output having multiple channels whose frequencies are locked together, with the second optical frequency comb output being supplied to a second input of optical switch 210.

Optical switch 210 includes, in one implementation, a high speed 1×2 optical switch that switches, based on control signals from LOS detection unit 220, one of the two inputs to a single output. For example, based on a control signal from LOS detection unit 220, optical switch 210 may switch the generated first optical frequency comb output of primary optical comb light source 200 through to the output of optical switch 210 (i.e., through to optical splitter 215). As another example, based on another control signal from LOS detection unit 220, optical switch 210 may switch the generated second optical frequency comb output of backup optical comb light source 205 through to the output of the optical switch 210 (i.e., through to optical splitter 215), instead of the generated first optical frequency comb output of primary optical comb light source 200.

Optical splitter 215 may split optical light received from optical switch 210 and pass the received light out two separate output ports of splitter 215, with the light being passed to LOS detection unit 220, and to optical modulators 170. LOS detection unit 220 receives (e.g., via the "tap" of optical splitter 215) the light from optical splitter 215, detects one or more wavelengths of the light using, for example, one or more optical detectors, and then analyzes the detected light to determine whether a loss of signal condition exists, indicating that primary optical comb light source 200 has failed and is no longer generating the first optical frequency comb light output. If LOS detection unit 220 determines that a loss of signal condition exists, then LOS detection unit 220 sends a control signal to optical switch 210 to switch the generated optical frequency comb output of backup optical comb light source 205 through optical switch 210 to optical splitter 215. The LOS detection by LOS detection unit 220 may be as short as, for example, a couple of nanoseconds, and the switching speed of optical switch 210 may be around 10 nanoseconds. Therefore, the interruption due to switching between the primary and backup comb light sources can be well below one microsecond in length. As a result, since LOS detection in the transport system is typically at least a few microseconds, the swapping of sources in optical comb sources 160 should not trigger auto-protection in the system.

Additionally, upon a determination that a loss of signal condition exists with respect to primary optical comb light source 200, LOS detection unit 220 sends a message, via network(s) 140, to system management node 150 notifying node 150 of the failure of primary optical comb light source 200 in optical transmitter 110. System management node 150 may, based on the notification, present an alert to system management personnel such that appropriate repair of optical transmitter 110 may be initiated.

As further shown in FIG. 2, optical modulators 170 of optical transmitter 110 include a tone separator 225, multiple modulators 230-1 through 230-n, a tone combiner 235, and an output optical amplifier 240.

Tone separator 225 couples to one of the outputs of optical splitter 215 and receives the generated optical frequency comb output of primary optical comb light source 200, or backup optical comb light source 205, depending on which frequency comb light source is currently switched through optical switch 210. The received optical frequency comb output includes multiple wavelengths $\lambda_1$ through $\lambda_n$, corresponding to channels 1 through n. Tone separator 225 wavelength division demultiplexes light of the multiple wavelengths $\lambda_1$ through $\lambda_n$ into multiple outputs, with each output of tone separator 225 being associated with a different wavelength of wavelengths $\lambda_1$ through $\lambda_n$. The multiple outputs of tone separator 225 connect to modulators 230-1 through 230-n, with each of modulators 230-1 through 230-n receiving a respective wavelength of wavelengths $\lambda_1$ through $\lambda_n$. For example, the first output of tone separator 225 includes demultiplexed light having a wavelength of $\lambda_1$ and is input to modulator 230-1. As a further example, the second output of tone separator 225 includes demultiplexed light having a wavelength of $\lambda_2$ and is input to modulator 230-2. As yet another example, the nth output of tone separator 225 includes demultiplexed light having a wavelength of $\lambda_n$ and is input to modulator 230-n.

Modulators 230-1 through 230-n (generically referred to herein as "modulator 230" or "modulators 230") each receives demultiplexed light of a respective wavelength from tone separator 225. For example, modulator 230-1 receives demultiplexed light of wavelength $\lambda_1$ from tone separator 225, modulator 230-2 receives demultiplexed light of wavelength $\lambda_2$ from tone separator 225, and modulator 230-n receives demultiplexed light of wavelength $\lambda_n$. Each modulator 230 applies differential phase modulation to the received light from tone separator 225 in accordance with data to be transmitted on the particular channel corresponding to the wavelength $\lambda$ handled by the modulator 230. For example, modulator 230-1 receives demultiplexed light of wavelength $\lambda_1$ from tone separator 225 and applies differential phase modulation to the light based on a first stream of data (not shown in FIG. 2) received at modulator 230-1. As another example, modulator 230-n receives demultiplexed light of wavelength $\lambda_n$ from tone separator 225 and applies differential phase modulation to the light based on an $n^{th}$ stream of data (not shown in FIG. 2) received at modulator 230-n.

Tone combiner 235 receives the modulated light of wavelengths $\lambda_1$ through $\lambda_n$ from modulators 230-1 through 230-n and multiplexes the light into a single multi-wavelength optical output comprising modulated optical signals of the multiple wavelengths $\lambda_1$ through $\lambda_n$. Tone combiner 235 supplies the multi-wavelength output to optical amplifier 240. Optical amplifier 240 amplifies the signal amplitudes of the various wavelengths $\lambda_1$ through $\lambda_n$ for transmission over optical fiber 130. Optical amplifier 240 may include, for example, one or more erbium doped fiber amplifiers. Optical fiber 130 is depicted as a single optical fiber span connecting optical transmitter 110 and optical receiver 130. In other implementations, however, optical fiber 130 may include multiple interconnecting fibers, possibly including optical switches or routers, for switching/routing optical signals from optical transmitter 110 to optical receiver 120.

FIG. 2 additionally depicts coherent receivers 180 of optical receiver 120 as including an input optical amplifier 245, a tone separator 250, multiple coherent receivers 255-1 through 255-n, and DSP 190.

Input optical amplifier 245 amplifies the signal amplitudes of the various wavelengths $\lambda_1$ through $\lambda_n$ of optical signals transmitted over optical fiber 130 and received at optical receiver 120. Optical amplifier 245 may include, for example, one or more erbium doped fiber amplifiers. Tone separator 250 wavelength division demultiplexes the single multi-wavelength optical output of optical transmitter 110, comprising modulated optical signals of the multiple wavelengths $\lambda_1$ through $\lambda_n$, into multiple outputs, with each output of tone separator 250 being associated with a different wavelength of wavelengths $\lambda_1$ through $\lambda_n$. The multiple outputs of tone separator 250 connect to coherent receivers 255-1 through 255-n.

Each of the coherent receivers 255-1 through 255-n receives demultiplexed optical signals of a respective one of wavelengths $\lambda_1$ through $\lambda_n$, coherently detects and analog-to-digital converts optical signals of the respective wavelength $\lambda$. Coherent receivers 255-1 through 255-n each pass the resulting digital signals to DSP 190 for digital signal processing.

DSP 190 performs, for example, forward error correction (FEC) upon the digital signals for each channel having one of the wavelengths $\lambda_1$-$\lambda_2$. In one exemplary implementation, the FEC algorithm performed by DSP 190 includes Reed-Solomon forward error correction. Other types of FEC, however, may alternatively be used. In addition, DSP 190 applies a non-linear compensation algorithm, described further below, to the forward error corrected digital signals to compensate for propagation nonlinearities induced during traversal of optical fiber 130.

Figure 3:
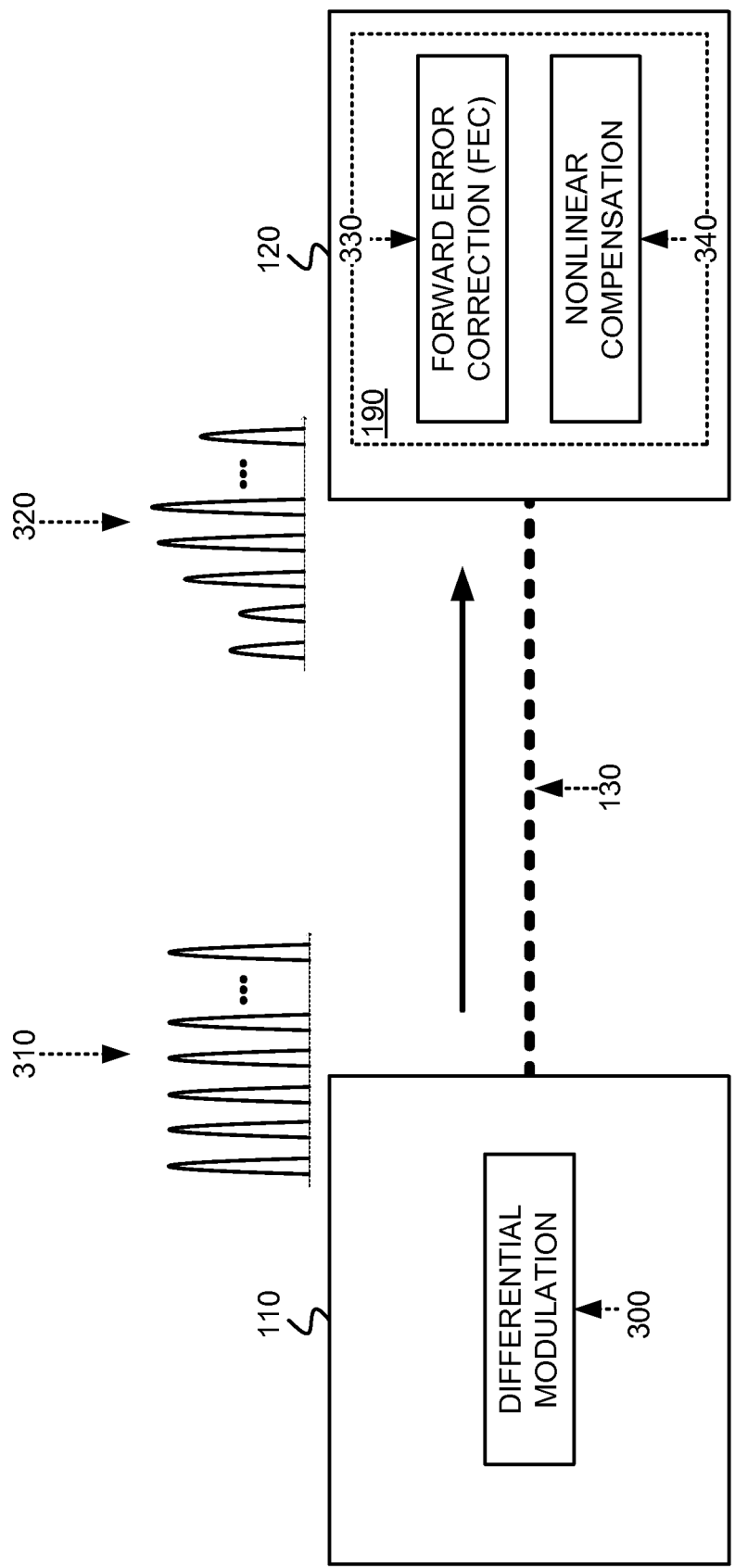
FIG. 3 is a diagram that depicts functions performed at the optical transmitter of FIG. 1 when transmitting optical signals using generated optical frequency comb light, and functions performed at the optical receiver of FIG. 1 when receiving and processing the transmitted optical signals after traversal of the optical fiber.
Figure 4:
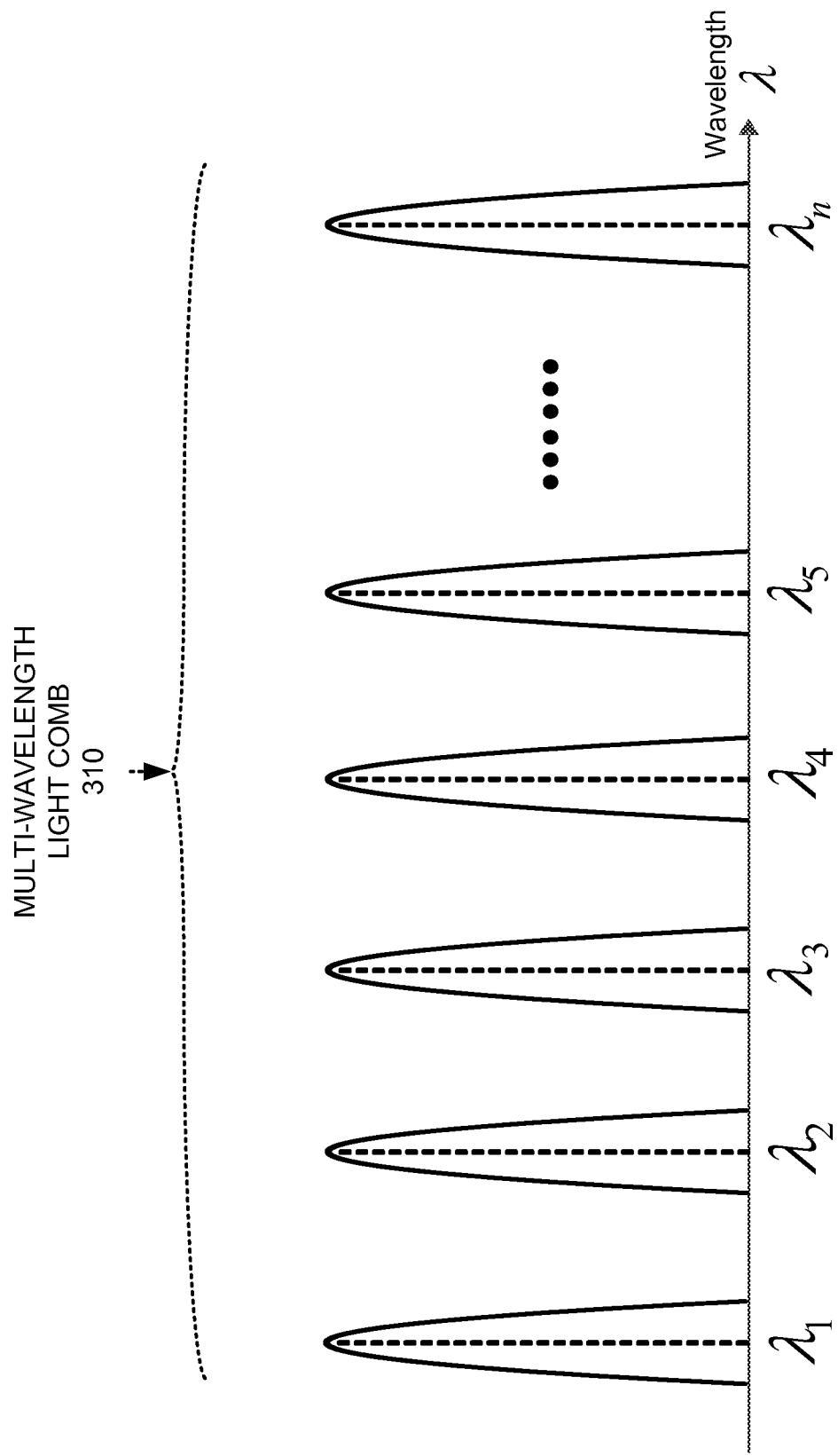
FIG. 4 is a diagram that depicts a multi-wavelength light comb transmitted by optical transmitter 110.

FIG. 3 is a diagram that depicts functions performed at optical transmitter 110 when transmitting optical signals using generated optical frequency comb light, and functions performed at optical receiver 120 when receiving and processing the transmitted optical signals after traversal of optical fiber 130. Primary optical comb light source 200, or backup optical comb light source 205 (not shown in FIG. 3), generates an optical frequency comb 310 that includes multiple channels of light. FIG. 4 depicts further details of the multiple wavelengths of the optical frequency light comb 310 generated at optical transmitter 110. As shown, optical frequency light comb 310 includes a comb of multiple different wavelengths $\lambda_1$ through $\lambda_n$, each wavelength $\lambda$ being associated with a respective one of channels 1 through n, with the frequency/wavelength of each of the channels 1 through n of comb 310 being locked to each other. For example, the frequency difference between the channels is constant across all the multiple channels of the frequency comb light. Light of each of the multiple channels of the generated optical frequency comb 310 may be modulated using differential modulation 300 based on received input data that is to be transmitted. In one implementation, the different modulation 300 may include differential phase modulation in which each optical signal is represented by a phase difference between two adjacent bits of data within the stream of the input data.

Figure 5:
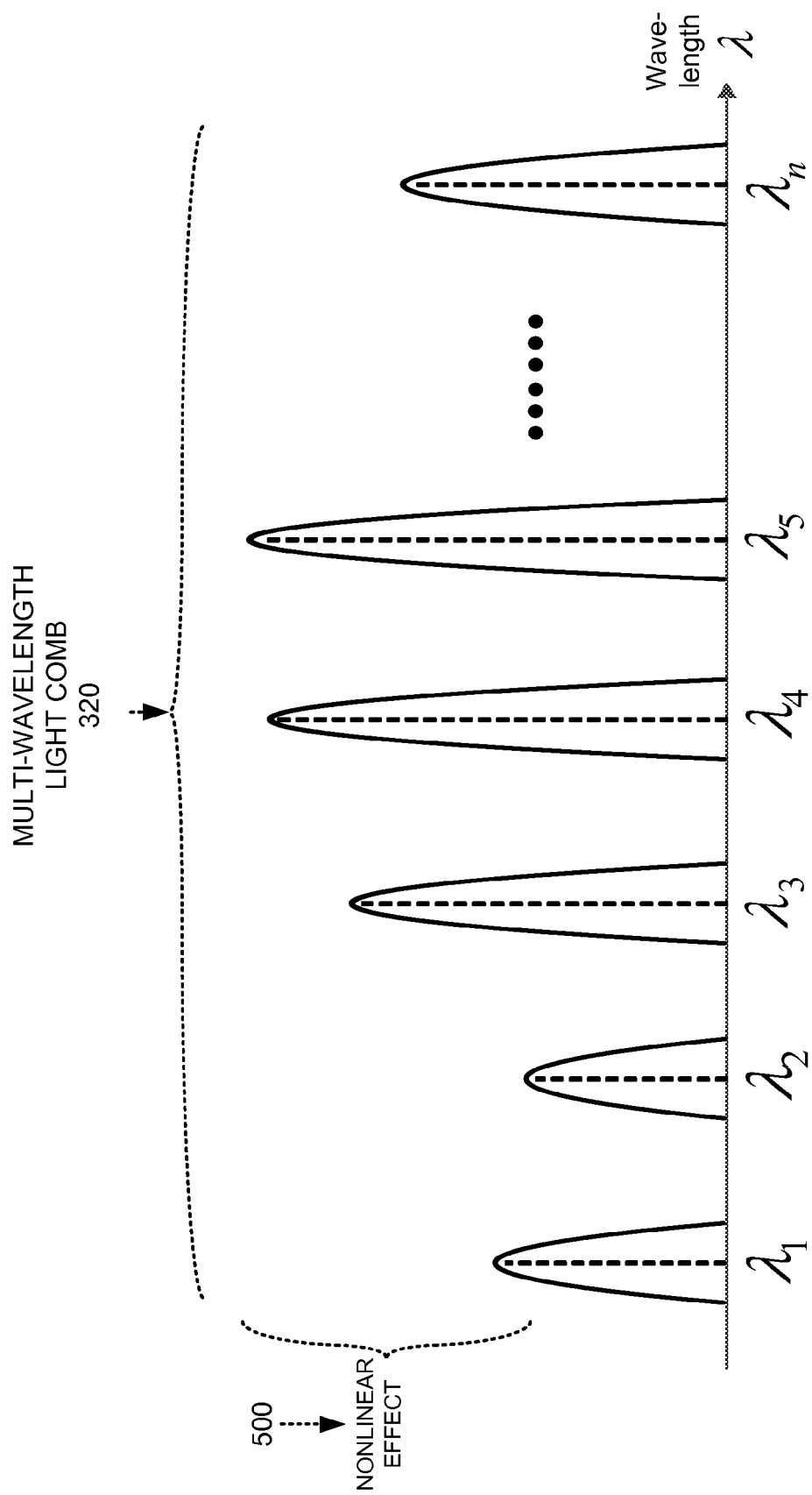
FIG. 5 is a diagram that depicts the multi-wavelength light comb of FIG. 4 after traversal of optical fiber and reception at the optical receiver of FIG. 1.

As the modulated optical frequency comb 310 traverses optical fiber 130, nonlinearities are introduced in the signals due to the fiber medium and due to the effect of neighboring channels in the optical frequency comb. Modulated optical frequency comb 310 is, therefore, received at optical receiver 120 as a nonlinear distorted version 320, as shown in FIG. 3, of the transmitted optical frequency comb 310. FIG. 5 depicts further details of the distorted light comb 320 as received at optical receiver 120 after traversing optical fiber 130. As seen in FIG. 5, a nonlinear effect 500 is evidenced in the multiple channels of received light comb 320, with the various wavelengths including a magnitude distortion relative to one another, and relative to transmitted light comb 310.

Referring again to FIG. 3, DSP 190 at optical receiver 120 performs forward error correction (FEC) 330 upon the received, differentially modulated signals. In one implementation, FEC 330 may include using a FEC algorithm such as the Reed-Solomon error correction algorithm. FEC 330 corrects any isolated phase errors introduced in the transmitted optical signals due to the interruption in the optical transmission that occurs when optical switch 210 switches in backup optical comb light source 205 in place of primary optical comb light source 200.

In addition, DSP 190 applies non-linear compensation 340 to the forward error corrected digital signals to compensate for propagation nonlinearities induced during traversal of optical fiber 130. Field propagation in optical fiber 130 is governed by the nonlinear Schrodinger equation, and the optical signals received at optical receiver 120 can be used as an initial condition. Using the nonlinear Schrodinger equation, and the received optical signals at optical receiver 120 as the initial condition, the Schrodinger equation may be used to computer model the signal transmitted at optical transmitter 110 prior to propagation across optical fiber 130. The result of the computer modeling, using the Schrodinger equation and the initial condition of the received optical signals, should be the original transmitted optical signals, from modulators 230-1 through 230-n, transmitted from optical transmitter 110. The computer modeling, using the Schrodinger equation, thus, mitigates for nonlinearities induced in the optical signals during traversal of optical fiber 130.

Figure 6A:
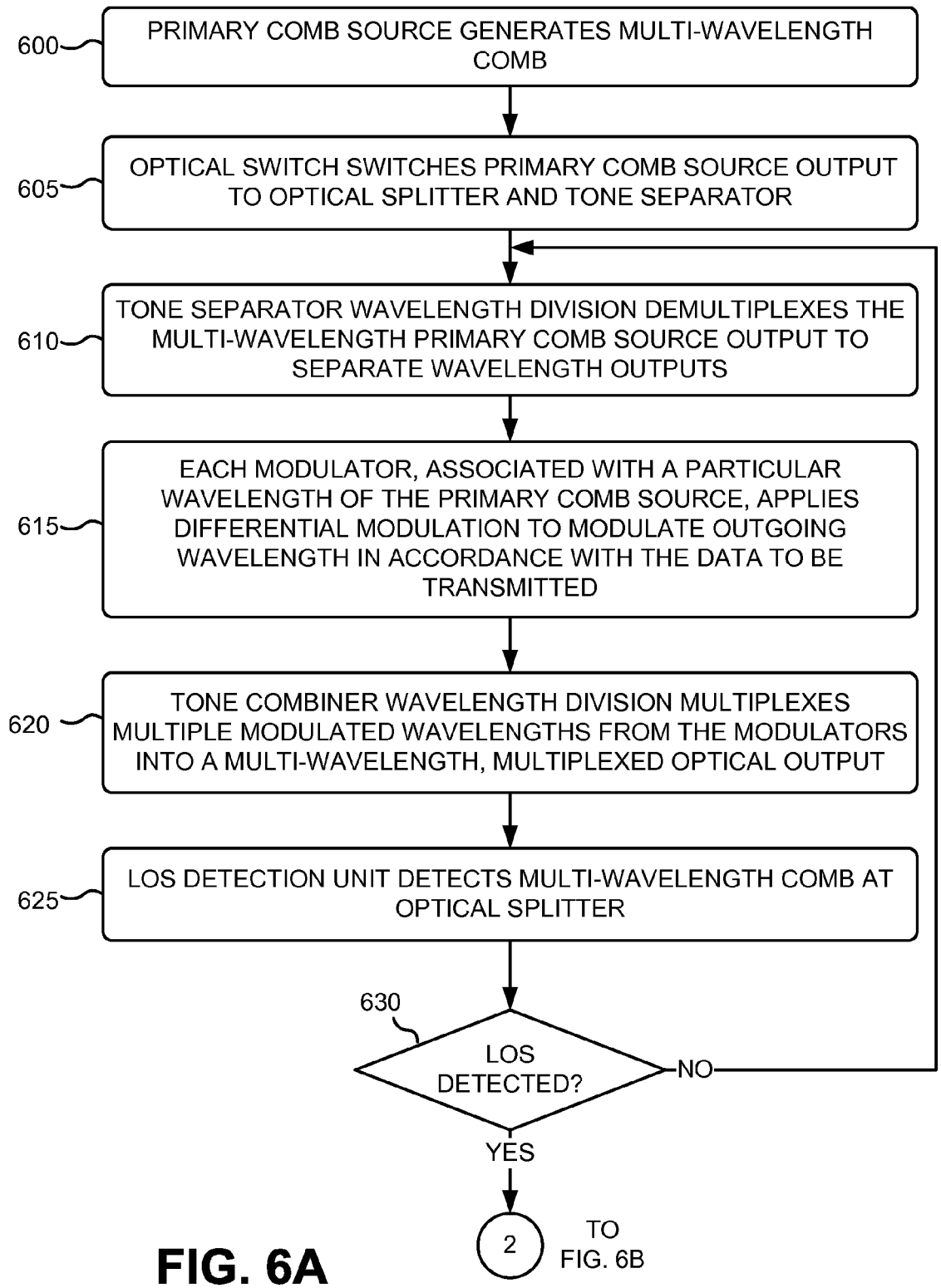
FIGS. 6A and 6B are flow diagrams that illustrate an exemplary process for transmitting optical signals via an optical frequency comb light source.
Figure 6B:
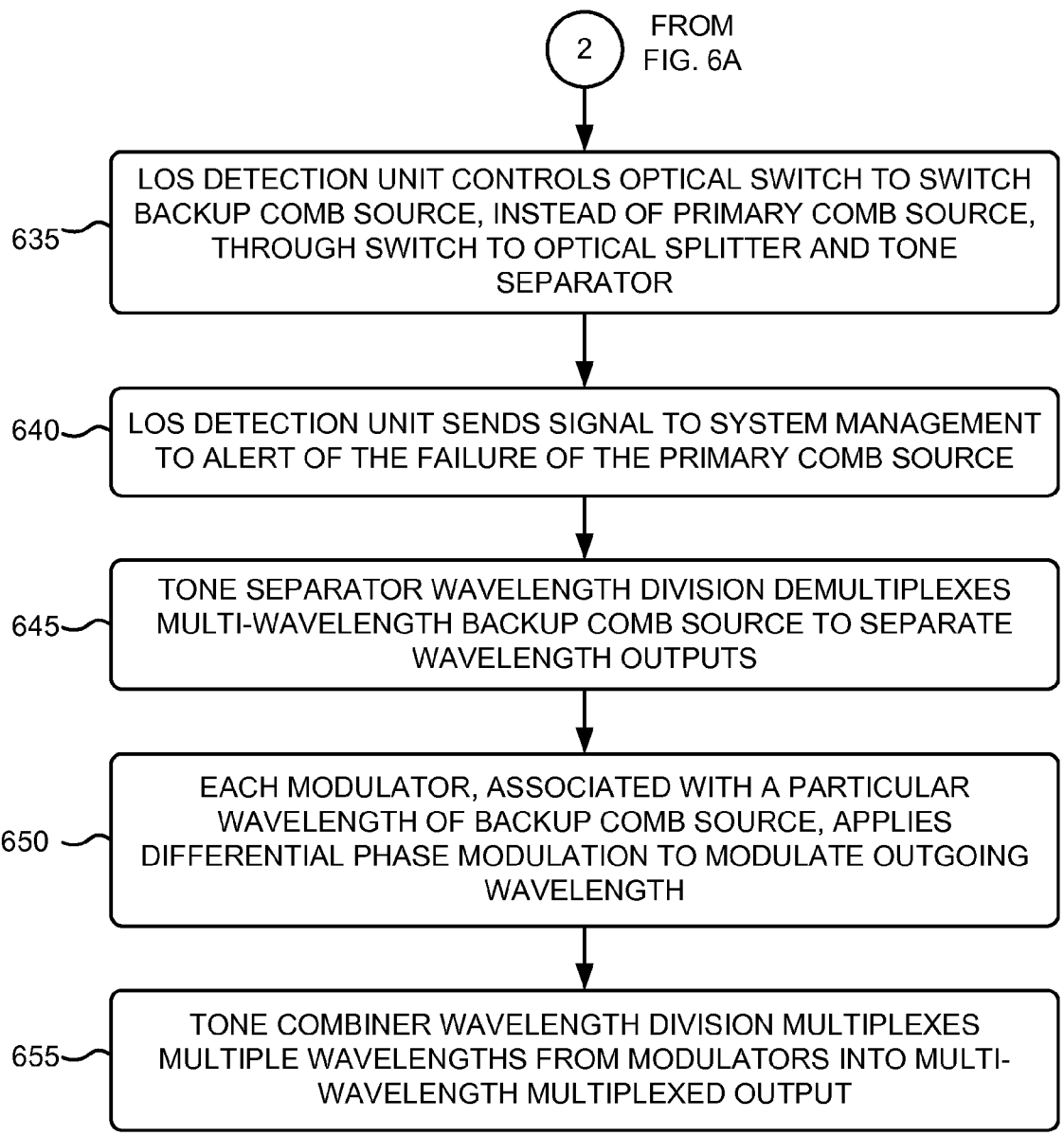

FIGS. 6A and 6B are flow diagrams that illustrate an exemplary process for transmitting optical signals via an optical frequency comb light source. The exemplary process of FIGS. 6A and 6B may be implemented by optical transmitter 110. The exemplary process of FIGS. 6A and 6B is described below with reference to FIGS. 1-5.

The exemplary process may include primary optical frequency comb light source 200 generating a multi-wavelength frequency comb (block 600). For example, primary optical frequency comb light source 200 generates light comb 310 depicted in FIG. 4, with the wavelength/frequency of each channel being locked to each other. Optical switch 210 switches the primary frequency comb output to optical splitter 215 and tone separator 225 (block 605). Based on control signals from LOS detection unit 220, optical switch 210 switches the multi-wavelength frequency comb output by primary optical frequency comb light source 200 through optical switch 210 to optical splitter 215 which, in turn, splits the light and provides the light to both LOS detection unit 220, and to tone separator 225 of optical modulators 170.

Tone separator 225 wavelength division demultiplexes the multi-wavelength primary comb source output to separate wavelength outputs (block 610). The multi-wavelength optical frequency comb generated by primary optical comb light source 200 is received at tone separator 225, which wavelength division demultiplexes the single input to multiple outputs, with each output corresponding to a single channel (e.g., a single wavelength of light). For example, referring to FIG. 2, tone separator 225 wavelength division demultiplexes an input optical frequency comb having light of wavelengths $\lambda_1$ through $\lambda_n$ into n different outputs of individual wavelengths $\lambda_1, \lambda_2, \lambda_3, \ldots, \lambda_n$.

Each modulator 230, associated with a particular wavelength of the primary comb source frequency comb output, applies differential modulation to modulate the outgoing wavelength in accordance with the data to be transmitted (block 615). Referring to FIG. 2, modulators 230-1 through 230-n each receive wavelength division demultiplexed light corresponding to a respective wavelength $\lambda_1$ through $\lambda_n$. Each modulator 230 receives an input data stream (not shown in FIG. 2) and performs differential modulation upon the demultiplexed light to generate a modulated optical signal output. In one implementation, the differential modulation may include differential phase modulation applied by each modulator 230 based on a respective stream of data received at that modulator. For example, modulator 230-2 receives demultiplexed light of wavelength $\lambda_2$ from tone separator 225, and sequential bits of a stream of input data, and differentially phase modulates the light of wavelength $\lambda_2$ based on the sequential bit values of the stream of input data.

Tone combiner 235 wavelength division multiplexes multiple wavelengths from modulators 230 into a multi-wavelength multiplexed optical output (block 620). Tone combiner 235 receives the multiple modulated optical signal outputs from modulators 230-1 through 230-n, including optical signals transmitted via wavelengths $\lambda_1$ through $\lambda_n$, and multiplexes the light of different wavelengths into a single multi-wavelength optical output, which is provided to optical amplifier 240. Optical amplifier 240 amplifies the multi-wavelengths of light to boost the signal power for transmission over optical fiber 130.

LOS detection unit 220 detects the multi-wavelength comb at optical splitter 215 (block 625). LOS detection unit 220 receives the optical frequency comb output of primary optical comb light source 200 from optical splitter 215 and, using optical detectors, detects the presence of light at one or more of the constituent wavelengths of the light of the optical frequency comb output. Detection of the presence of light indicates no loss of signal, and detection of an absence of light indicates a loss of signal condition at primary optical comb light source 200. If LOS detection unit 220 detects the multi-wavelength frequency comb at optical splitter 215, indicating that there this is no loss of signal (NO—block 630), then the exemplary process may return to block 610.

If LOS detection unit 220 detects a loss of signal at optical splitter 215 (YES—block 630), then LOS detection unit 220 sends control signals to optical switch 210 to switch backup optical comb light source 205, instead of primary optical comb light source 200, through optical switch 210 to optical splitter 215 and tone separator 225 (block 635). If primary optical comb light source 200 incurs a failure, and ceases to generate an optical frequency comb light output, then LOS detection unit 220 will detect the absence of light at the output of optical splitter 215. This absence of light indicates a loss of signal condition at primary optical comb light source 200, causing LOS detection unit 220 to send a control signal(s) to optical switch 210 to cause optical switch 210 to "switch out" (i.e., disconnect) primary optical comb light source 200, and to "switch in" (i.e., connect) backup optical comb light source 205.

LOS detection unit 220 sends a signal to system management node 150 to alert of the failure of the primary optical comb light source 200 (block 640). LOS detection unit 220 sends a message, via network(s) 140 to system management node 150 that includes data identifying optical transmitter 110, and identifying a failure of primary optical comb light source 200. The message may additionally include a date and time at which the loss of signal by light source 200 was detected at LOS detection unit 220.

Tone separator 225 wavelength division demuliplexes the multi-wavelength backup comb source output to separate wavelength outputs (block 645). The multi-wavelength optical frequency comb generated by backup optical comb light source 205 is received at tone separator 225, which wavelength division demultiplexes the single input to multiple outputs, with each output corresponding to a single channel (e.g., a single wavelength of light). For example, referring to FIG. 2, tone separator 225 wavelength division demultiplexes an optical frequency comb having light of wavelengths $\lambda_1$ through $\lambda_n$ into n different outputs of individual wavelengths $\lambda_1, \lambda_2, \lambda_3, \ldots, \lambda_n$.

Each modulator 230, associated with a particular wavelength of the backup comb source frequency comb output, applies differentials phase modulation to modulate the outgoing wavelength in accordance with the data to be transmitted (block 650). Referring to FIG. 2, modulators 230-1 through 230-n each receive wavelength division demultiplexed light corresponding to a respective wavelength $\lambda_1$ through $\lambda_n$. Each modulator 230 receives an input data stream (not shown in FIG. 2) and performs differential modulation upon the demultiplexed light to generate a modulated optical signal output. In one implementation, the differential modulation may include differential phase modulation applied by each modulator 230 based on a respective stream of data received at that modulator. For example, modulator 230-n receives demultiplexed light of wavelength $\lambda_n$ from tone separator 225, and sequential bits of a stream of input data, and differentially phase modulates the light of wavelength $\lambda_n$ based on the sequential bit values of the stream of input data.

Tone combiner 235 wavelength division multiplexes multiple wavelengths from modulators 230 into a multi-wavelength multiplexed optical output (block 655). Tone combiner 235 receives the multiple modulated optical signal outputs from modulators 230-1 through 230-n, including optical signals transmitted via wavelengths $\lambda_1$ through $\lambda_n$, and multiplexes the light of different wavelengths into a single multi-wavelength optical output, which is provided to optical amplifier 240. Optical amplifier 240 amplifies the multi-wavelengths of light to boost the signal power for transmission over optical fiber 130.

Figure 7:
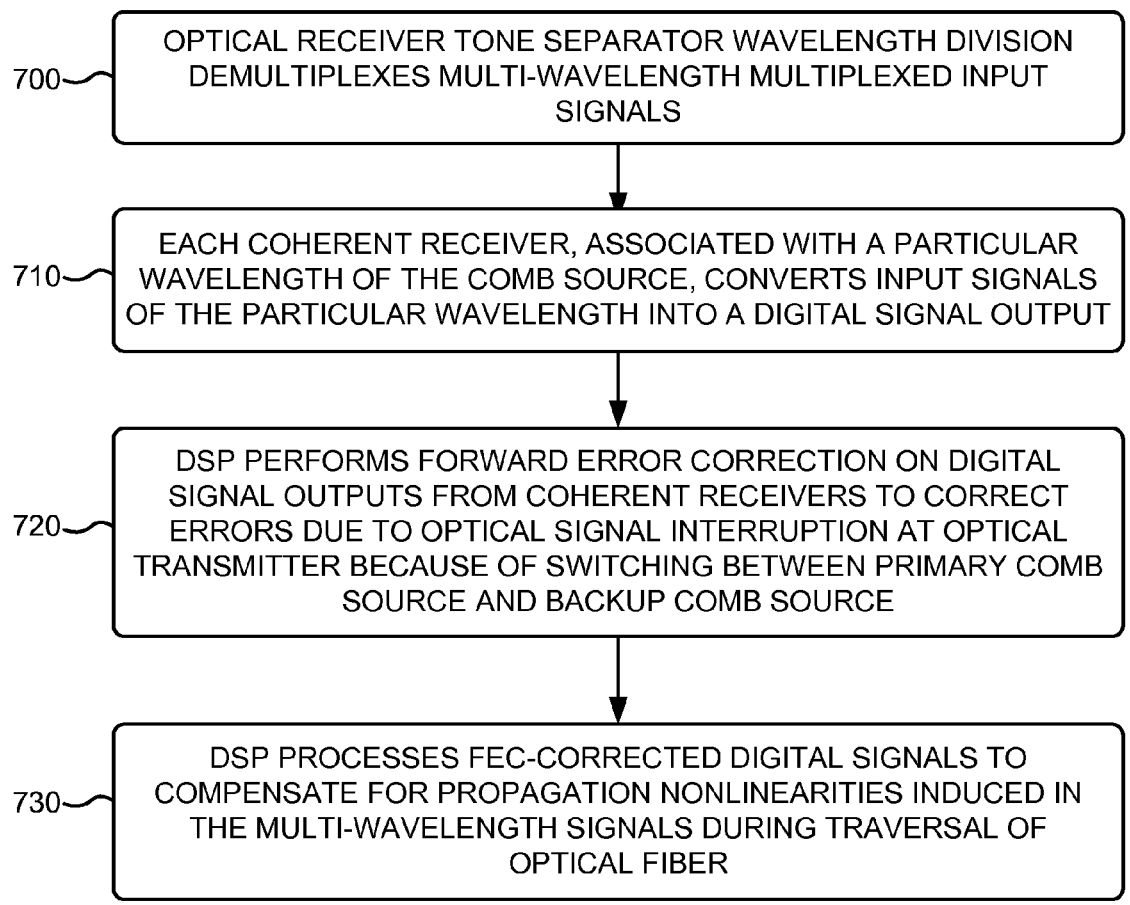
FIG. 7 is a flow diagram that illustrates an exemplary process for receiving optical signals transmitted by an optical frequency comb light source over an optical fiber(s).

FIG. 7 is a flow diagram that illustrates an exemplary process for receiving optical signals transmitted by an optical frequency comb light source over an optical fiber(s). The exemplary process of FIG. 7 may be implemented by optical receiver 120.

The exemplary process includes tone separator 250 of optical receiver 120 wavelength division demultiplexing multi-wavelength multiplexed input signals received from optical transmitter 110 over an optical fiber(s) (block 700). Referring to FIG. 2, modulated multi-wavelength light signals received over optical fiber 130 from optical transmitter 110 are amplified by optical amplifier 245 and provided to tone separator 250. Tone separator 250 wavelength division demultiplexes the single input, comprising the differentially modulated optical frequency comb, into multiple outputs, with each of the outputs corresponding to one of the multiple wavelengths $\lambda_1$ through $\lambda_n$.

Each of coherent receivers 255-1 through 255-n, associated with a particular wavelength of the comb source, converts input optical signals of the particular wavelength into a digital signal output (block 710). Each of the coherent receivers 255-1 through 255-n receives demultiplexed optical signals of a respective one of wavelengths $\lambda_1$ through $\lambda_n$ from tone separator 250, and coherently detects and analog-to-digitally converts the optical signals of the respective wavelength $\lambda$. Coherent receivers 255-1 through 255-n each pass the resulting digital signals to DSP 190 for digital signal processing. Coherent receivers 255 may use known techniques for coherently detecting and converting modulated light signals of a respective wavelength $\lambda$ to a digital signal output.

DSP 190 performs forward error correction (FEC) on the digital signal outputs from coherent receivers 255-1 through 255-n to correct errors due to, for example, optical signal interruption at optical transmitter 110 because of switching between primary comb source 200 and backup comb source 205 (block 720). The errors may include, for example, phase error that may occur when the timing of optical transmitter 110 and optical receiver 120 go out of alignment due to optical signal interruption at optical transmitter 110 that occurs briefly when optical switch 210 switches between primary comb light source 200 and backup optical comb light source 205. In one exemplary implementation, DSP 190 employs a FEC algorithm such as, for example, Reed-Solomon error correction. Other types of FEC, however, may alternatively be used. Use of FEC by DSP 190 may include resetting the reference phase to handle the short optical interruption due to swapping between primary optical comb light source 200 and backup optical comb light source 205.

DSP 190 processes the FEC-corrected digital signals to compensate for propagation nonlinearities induced in the multi-wavelength signals during traversal of the optical fiber (block 730). As previously described, DSP 190 applies non-linear compensation 340 to the FEC-corrected digital signals, based on the Schrodinger equation, to cancel non-linearities induced in the signals while traversing optical fiber 130. Using the nonlinear Schrodinger equation, and the received optical signals at optical receiver 120 as an initial condition, the Schrodinger equation may be used to computer model the signal transmitted at optical transmitter 110 prior to propagation across optical fiber 130. The result of the computer modeling, using the Schrodinger equation and the initial condition of the received optical signals, should be the original optical signals, reconstructed via the computer modeling, transmitted by optical transmitter 110.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIGS. 6A, 6B and 7, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An optical transmitter, comprising:
a first optical light source configured to generate a first optical frequency comb output having multiple channels whose frequencies are locked together;
a second optical light source configured to generate a second optical frequency comb output having multiple channels whose frequencies are locked together;
an optical switch, including an optical output;
a detection unit configured to:
detect a loss of signal (LOS) condition associated with the generation of the first optical frequency comb output of the first optical light source, send a control signal to the optical switch, based on the detected LOS condition, to cause the optical switch to switch the second optical frequency comb output of the second optical light source, instead of the first optical frequency comb output of the first optical light source, through to the optical output of the optical switch;

a tone separator configured to wavelength division demultiplex the multiple channels of the second optical frequency comb output into multiple outputs, with each channel of the multiple channels being output via a different output of the multiple outputs;

a plurality of optical modulators, comprising one of the plurality of optical modulators for each channel of the multiple channels, and configured to modulate light of the multiple channels of the second optical frequency comb output based on data to be transmitted; and a tone combiner configured to wavelength division multiplex the modulated light of the multiple channels into a single output.

2. The optical transmitter of claim 1, wherein the plurality of optical modulators are configured to apply differential phase modulation to modulate the light of the multiple channels of the second optical frequency comb output based on data to be transmitted.

3. The optical transmitter of claim 1, further comprising:
an optical splitter coupled to the optical output of the optical switch and configured to provide the second optical frequency comb output to the detection unit and to the tone separator.

4. The optical transmitter of claim 1, further comprising:
an optical amplifier coupled to the single output of the tone combiner and configured to amplify the modulated light of the multiple channels from the tone combiner.

5. The optical transmitter of claim 4, wherein the optical amplifier comprises one or more erbium doped fiber amplifiers.

6. A system, comprising:
an optical transmitter comprising:
a first frequency comb light source that generates a first optical frequency comb output having a set of multiple, discrete frequencies that are locked together,
a second frequency comb light source that generates a second optical frequency comb output having the set of multiple, discrete frequencies that are locked together,
an optical switch configured to selectively switch either the first frequency comb light source or the second frequency comb light source through to an output of the optical switch, and
optical modulators configured to apply differential phase modulation, to channels associated with the switched first frequency comb light source or with the second frequency comb light source, to generate modulated optical output signals.

7. The system of claim 6, wherein the channels associated with the switched first frequency comb light source or with the second frequency comb light source comprise a plurality of wavelengths of light, with each of the channels being associated with a different one of the plurality of wavelengths of light.

8. The system of claim 6, wherein the optical transmitter further comprises:
a tone separator configured to wavelength division demultiplex multiple channels of the second frequency comb light source into multiple outputs, with each channel of the multiple channels being output via a different output of the multiple outputs.

9. The system of claim 8, wherein each optical modulator of the optical modulators is configured to modulate light of a respective one of the multiple channels of the second frequency comb light source based on data to be transmitted.

10. The system of claim 9, wherein the optical transmitter further comprises:
a tone combiner configured to wavelength division multiplex the modulated light output signals from the optical modulators.

11. The system of claim 6, wherein the optical transmitter further comprises:
a detection unit configured to:
detect a loss of signal (LOS) condition associated with the first frequency comb light source, and
send a control signal to the optical switch, based on the detected LOS condition, to cause the optical switch to switch the second frequency comb light source through to the output of the optical switch, instead of the first frequency comb light source.

12. The system of claim 6, wherein each of the multiple, discrete frequencies of the first optical frequency comb output and the second optical frequency comb output comprise a different channel of multiple channels.

13. The system of claim 6, wherein each optical modulator of the optical modulators applies differential phase modulation to a different one of the channels, associated with the switched first frequency comb light source or with the switched second frequency comb light source, based on data to be transmitted.

14. The system of claim 6, further comprising:
an optical receiver coupled to an optical fiber and comprising:
coherent receivers configured to:
receive, via the optical fiber, the modulated light output signals from the optical transmitter,
detect and process the received, modulated light output signals to generate corresponding digital signals, and
a digital signal processor (DSP) configured to apply forward error correction (FEC) to the digital signals to generate forward error corrected digital signals.

15. The system of claim 14, wherein the DSP is further configured to:
process the forward error corrected digital signals to apply nonlinear compensation that mitigates nonlinearities induced during optical fiber traversal.

16. A method, comprising:
causing a first frequency comb light source to generate a first optical frequency comb output having multiple channels comprising a set of multiple, discrete frequencies that are locked together;
causing a second frequency comb light source to generate a second optical frequency comb output having the multiple channels comprising the set of the multiple, discrete frequencies that are locked together;
detecting a loss of signal (LOS) condition associated with the generation of the first optical frequency comb output of the first frequency comb light source;
causing an optical switch to switch the second optical frequency comb output of the second frequency comb light source, instead of the first optical frequency comb output of the first frequency comb light source, through to the optical output of the optical switch based on the detected LOS condition associated with the generation of the first optical frequency comb output of the first frequency comb light source;

wavelength division demultiplexing the multiple channels of the second optical frequency comb output into multiple outputs, with each channel of the multiple channels being output via a different output of the multiple outputs;

optically modulating light of the multiple channels of the second optical frequency comb output based on data to be transmitted; and wavelength division multiplexing the modulated light of the multiple channels into a single output coupled to an optical fiber.

17. The method of claim 16, wherein detecting the LOS condition associated with the generation of the first optical frequency comb output of the first frequency comb light source comprises:

tapping, prior to causing the switching, an output of the optical switch, wherein the output comprises the first optical frequency comb output of the first frequency comb light source;

detecting one or more wavelengths of light associated with the first optical frequency comb output of the first frequency comb light source; and identifying the LOS condition based on a failure of the detection of the one or more wavelengths of light associated with the first optical frequency comb output of the first frequency comb light source.

18. The method of claim 16, wherein optically modulating the light of the multiple channels comprises:

applying differential phase modulation to the light of the multiple channels of the second optical frequency comb output based on the data to be transmitted.

19. The method of claim 16, wherein wavelength division demultiplexing the multiple channels of the second optical frequency comb output comprises:

wavelength division demultiplexing a first channel of the multiple channels of the second optical frequency comb output into a first demultiplexed output of the multiple outputs;

wavelength division demultiplexing a second channel of the multiple channels of the second optical frequency comb output into a second demultiplexed output of the multiple outputs;

optically modulating light of the first channel of the first demultiplexed output based on a first data stream of the data to be transmitted; and optically modulating light of the second channel of the second demultiplexed output based on a second data stream of the data to be transmitted.

20. The method of claim 19, wherein optically modulating the light of the first channel of the first demultiplexed output comprises applying differential phase modulation to the light of the first channel of the multiple channels of the second optical frequency comb output based on the first data stream of the data to be transmitted, and wherein optically modulating the light of the second channel of the second demultiplexed output comprises applying differential phase modulation to the light of the second channel of the multiple channels of the second optical frequency comb output based on the second data stream of the data to be transmitted.

* * * * *